No. 769,254.

Patented September 6, 1904.

UNITED STATES PATENT OFFICE.

STANLEY CHARLES CUTHBERT CURRIE, OF NEW YORK, N. Y., ASSIGNOR OF ONE-HALF TO WILLIAM COURTENAY, OF NEW YORK, N. Y.

METHOD OF EXTRACTING PRECIOUS METALS FROM THEIR ORES.

SPECIFICATION forming part of Letters Patent No. 769,254, dated September 6, 1904.

Application filed April 16, 1903. Serial No. 152,857. (No specimens.)

*To all whom it may concern:*

Be it known that I, STANLEY CHARLES CUTHBERT CURRIE, a citizen of Great Britain, residing at New York, in the county of New York and State of New York, have invented certain new and useful Improvements in Methods of Extracting Precious Metals from Their Ores, of which the following is a specification.

This invention relates to a method of treating ores or concentrates containing precious metals and also containing various other substances, such as lead, zinc, arsenic, sulfur, &c. Such ores as are generally called "sulfurets" are in many instances amenable to treatment by this method with excellent results.

The object of this invention is to economize the consumption of chemicals and to utilize so far as possible the chemical agents contained in the ores themselves, while at the same time recovering all or nearly all the valuable elements contained in the ore.

The method may be called the "step-by-step" method, since it practically attacks and removes from the main body of the ore some one or more element at a time and preserves for future use on the ore itself or elsewhere such chemicals as the ore contains which are available for such purposes.

In carrying out my invention I take ores adapted for such purpose, generally known as "sulfurets"—that is, ores containing precious metal, and usually base metal in some form, and sulfur—with other ingredients. The ore is crushed and may be concentrated. Then in a raw state it is subjected in a suitable vessel to the action of steam or of heated hydrogen gas, or both. Sulfureted-hydrogen gas is usually thrown off in large quantities under this treatment. This gas is stored or conducted away for subsequent use, as will be explained. The ore from which sulfureted hydrogen has been thus withdrawn or any ore of the general character known as "sulfuret" is now roasted in any suitable roasting-furnace. While in the roasting-furnace the pulverized ore is subjected to the action of steam or hot air or steam and hot air alternately or separately for the purpose of oxidizing such elements as are capable of oxidation. This treatment by steam and hot air for the purpose of oxidation is now well known in this art.

One advantage of the aforementioned steps in the process is the driving off of certain volatile substances, such as sulfur, arsenic, &c. The sulfur when driven off in the form of sulfureted hydrogen or sulfur dioxid ($SO_2$) is stored or confined for subsequent use or preferably at once conducted by a suitable conduit to the solutions, as will be hereinafter described.

The roasted ores or concentrates having been exposed to the oxidation treatment above referred to are converted or transformed from sulfurets into oxids and are now ready for the next step in the process. The ore, in some cases while still heated, is immersed in a caustic alkaline solution, such as caustic potash or caustic soda. The alkaline solution will usually be kept at a high temperature by the heat of the hot ore. If this is not sufficient, the alkali can be kept hot by waste heat from the roasting-furnace. The alkaline treatment of the ore dissolves out many of the soluble substances therein, such as the salts or oxids of lead, zinc, and other base metals. After the ore has been subjected to the alkaline treatment in a suitable tank or vessel until the soluble portion is nearly or quite dissolved the alkaline solution is drawn off into a separate tank and sulfureted-hydrogen gas is passed into the solution. This precipitates the base metals, which can then be withdrawn and saved, and the alkaline solution is restored to very nearly its original condition and can be reused indefinitely. After or before the alkaline solution has been withdrawn from the ore the ore may be washed in water, and any of the elements soluble in water are thus removed. The ore so treated is now ready for treatment by chemical agencies for extracting the precious metals. If a chlorin solution is used, the same may be obtained by the electrolytic decomposition of salt, (chlorid of sodium,) and the same decomposition will produce caustic soda, an alkaline agent hereinbefore referred to, and hydrogen gas, also before referred to. The gases driven off from the ore in roasting may be mixed and used to form the sulfureted hydrogen referred to as a revivifying agent for the caustic alkaline solution. Sulfureted hydrogen is also used to good advantage in many instances in precipitating gold and other metals from the chlorin solution.

If the ore contains both gold and silver, after the ore has been treated with a chlorin solution and the gold precipitated as above the silver chlorid can be extracted by treatment of the remaining mass by a solution of hyposulfite of sodium and then precipitated by the use of sodium sulfid. Compounds of sodium and sulfur can be produced from the alkaline agent above mentioned by the addition of sulfur dioxid, which can be obtained by roasting sulfurets in the presence of air.

It often happens in the same mine that one portion or body of ore will contain much more sulfur or other element than will another body of ore. Expert skill is required to select such portion as may be required for a particular purpose; but by utilizing the properties of the various elements found in ores, such as sulfurets, nearly all the chemicals necessary for the reduction of the ores may be found therein, and by withdrawing an element at one stage of the process and utilizing it at another stage or, what is practically the same thing, utilizing the element on other ore which has reached a different stage very effective and economical results may be obtained.

What I claim is—

1. The step in the art of treating ores containing precious metal and sulfur, which consists in subjecting the ore to the action of a hot vapor containing hydrogen, and withdrawing sulfureted-hydrogen gas therefrom, then roasting the ore in the presence of air.

2. The step in the art of treating ores containing precious metal and sulfur, which consists in subjecting the ore to the action of heat and hydrogen and withdrawing sulfureted hydrogen thus produced, and utilizing said sulfureted hydrogen for subsequent precipitation of metals from their solutions.

3. The step in the art of treating ores containing precious metal and sulfur, which consists in treating the raw ore to obtain sulfureted hydrogen therefrom, then roasting the ore, then treating the same with hot caustic-alkali solution, then withdrawing the alkali and treating the same with the sulfureted hydrogen to precipitate the base metal therein and restore the alkali for further use.

4. The step in the art or subprocess of treating ores containing precious metal and sulfur, which consists in supplying hydrogen to the same, withdrawing sulfur from the raw ore, then roasting the ore and submitting it to alkaline treatment, then withdrawing the alkali and restoring its strength by the addition of the sulfureted hydrogen, then chlorinating the ore, and afterward subjecting the chlorid solution to sulfureted-hydrogen treatment.

5. The improvement in the art or subprocess which consists in subjecting ore containing sulfur to the action of hydrogen and withdrawing sulfureted hydrogen, then treating the ore with a hot alkaline solution, then withdrawing this solution and revivifying it by the sulfureted hydrogen.

6. The step or improvement in the art of extracting precious metals from their ores, which consists in developing sulfureted-hydrogen gas from the ore at an early stage of the operation, subjecting the ore to intermediate treatment, and restoring sulfureted-hydrogen gas after such treatment.

7. The step in the art or subprocess of extracting precious metals from ores, which consists in supplying hydrogen to the same, withdrawing sulfur from the raw ore, roasting the ore and submitting it to alkaline treatment, withdrawing the alkali and restoring its strength by the addition of sulfureted hydrogen, chlorinating the ore and subjecting the chlorid solution to sulfureted hydrogen, then treating the residuum by sodium hyposulfite.

In testimony whereof I affix my signature in presence of two witnesses.

STANLEY CHARLES CUTHBERT CURRIE.

Witnesses:
GEORGE L. COURTENAY,
H. M. GRANT.